United States Patent
Dallas

[19]

[11] Patent Number: 5,875,515
[45] Date of Patent: Mar. 2, 1999

[54] CAN SCRAPER HAVING FLEXBILE CHARACTERISTICS

[76] Inventor: Gene Dallas, 41900 Lamier, Novi, Mich. 48377

[21] Appl. No.: 789,055

[22] Filed: Jan. 28, 1997

[51] Int. Cl.[6] .................................................. A47L 13/02
[52] U.S. Cl. ................................. 15/236.05; 15/236.01; 30/169; 294/49; D32/49
[58] Field of Search ........................... 15/236.01, 236.02, 15/236.07–236.09, 245, 245.1, 236.05; 30/169; 294/49, 55; D32/46–49

[56] References Cited

U.S. PATENT DOCUMENTS

| | | | |
|---|---|---|---|
| 1,484,166 | 2/1924 | Wolk | 30/169 |
| 1,898,690 | 2/1933 | Schact | 15/245 |
| 2,019,975 | 11/1935 | Hoyer | 30/140 |
| 2,046,334 | 7/1936 | Loeber | 30/169 |
| 2,046,599 | 7/1936 | Andrews | 15/245 |
| 2,188,114 | 1/1940 | Hubbard | 15/245 |
| 2,472,668 | 6/1949 | Lewandowski | 15/236.07 X |
| 2,807,168 | 9/1957 | Wipf | 73/245 |
| 2,900,656 | 8/1959 | Tupper | 15/245 |
| 2,935,758 | 5/1960 | Muscott | 15/236.07 |
| 3,504,391 | 4/1970 | McCarty | 15/236.07 |
| 3,551,937 | 1/1971 | Nelson | 15/236.08 |
| 4,197,017 | 4/1980 | Whelan | 366/343 |
| 4,248,660 | 2/1981 | Johnson | 15/236.01 X |
| 4,324,018 | 4/1982 | Olsson | 15/236.03 |
| 4,355,432 | 10/1982 | Storm, Jr. | 15/245 |
| 4,380,840 | 4/1983 | Rieckenberg | 15/105 |
| 4,627,128 | 12/1986 | Shea | 15/236.07 |
| 4,674,186 | 6/1987 | Galiano | 30/169 |
| 4,748,711 | 6/1988 | Markus | 15/227 |
| 4,969,675 | 11/1990 | Zahrowski | 15/236.08 X |
| 4,987,635 | 1/1991 | Young | 15/236.01 |
| 5,095,573 | 3/1992 | Henke et al. | 15/236.01 X |
| 5,291,992 | 3/1994 | Olivetti | 206/223 |
| 5,345,642 | 9/1994 | Faldetta | 15/105 |
| 5,347,676 | 9/1994 | Saitoh | 15/245 |
| 5,357,646 | 10/1994 | Kim | 15/111 |
| 5,491,868 | 2/1996 | Baggenstos | 15/236.09 |

*Primary Examiner*—Mark Spisich
*Attorney, Agent, or Firm*—Harness, Dickey & Pierce, P.L.C.

[57] ABSTRACT

A scraper for removing residual material from a container having a curved wall. The scraper includes a spatula component and a rigid handle component. The spatula component is made of a substantially flexible material having formed thereon rigid top and side members along the upper portion. The handle component continues onto the spatula component such that a rigid spine is formed therealong. This construction allows flexing of the lower portion about the rigid spine but restricts flexing of the upper portion.

13 Claims, 2 Drawing Sheets

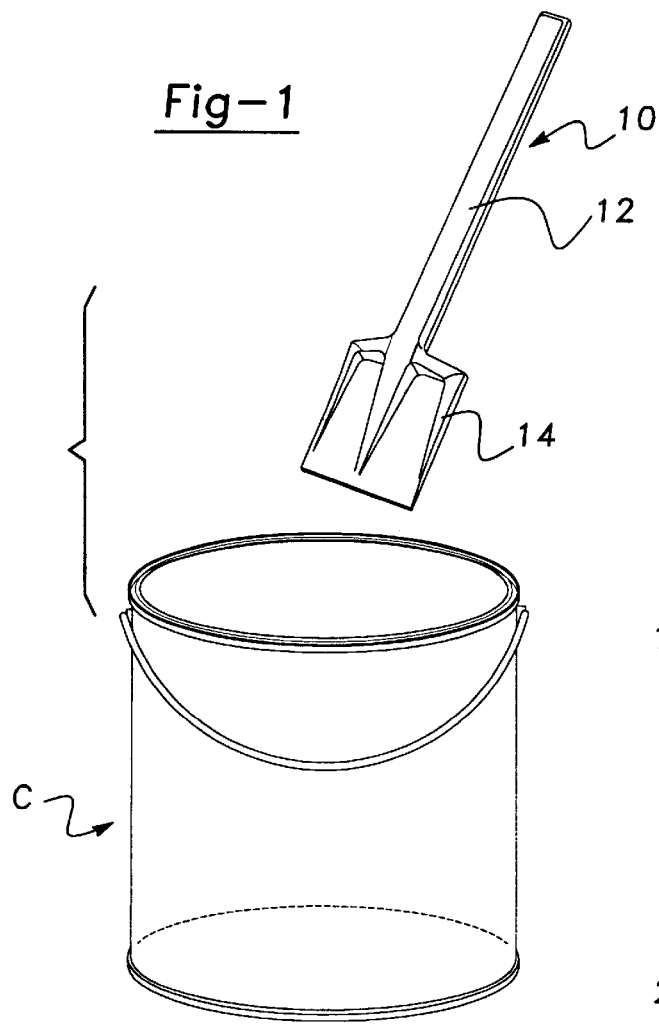
Fig-1
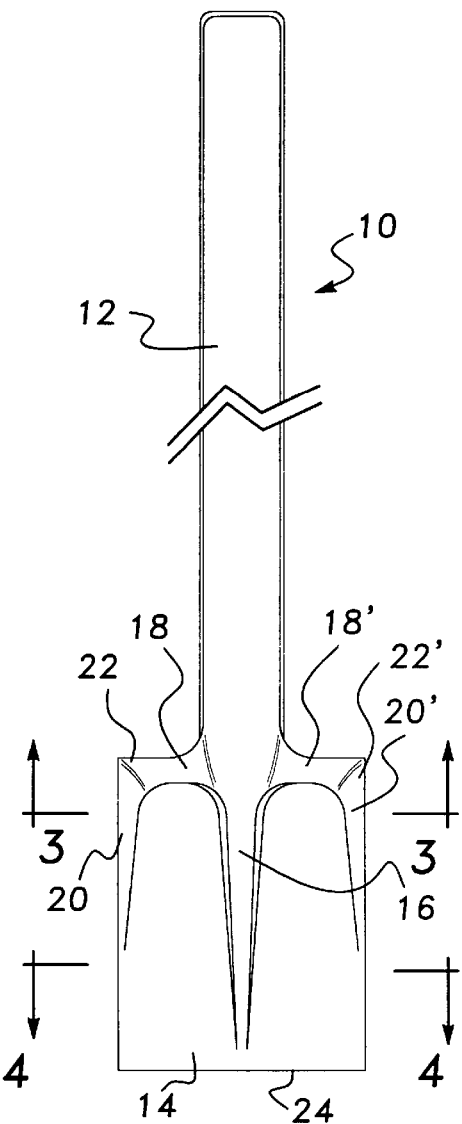
Fig-2
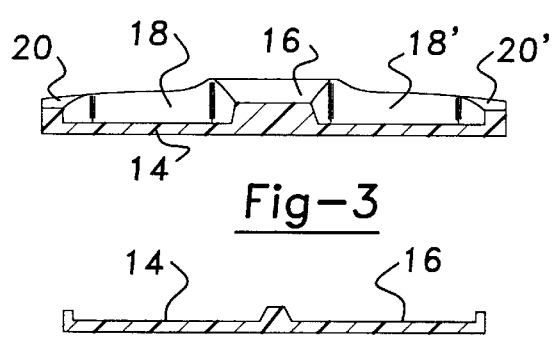
Fig-3
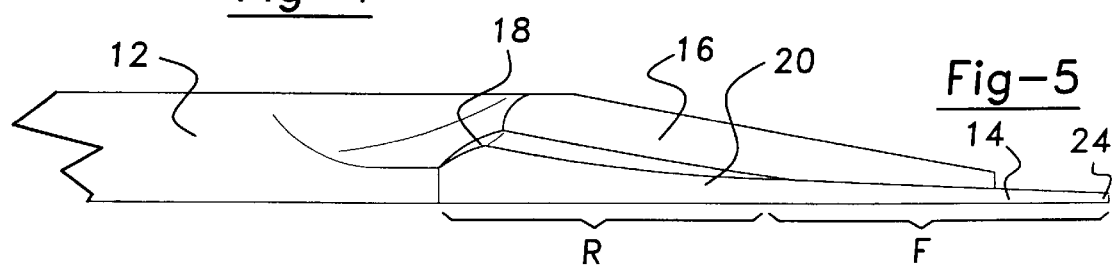
Fig-4
Fig-5

CAN SCRAPER HAVING FLEXBILE CHARACTERISTICS

BACKGROUND OF THE INVENTION

The present invention generally relates to scrapers for removing residual material from a can or a similar container. More particularly, the present invention relates to such a scraper having semi-flexible characteristics such that only a portion of the scraper is flexible, while the rest of the scraper is rigidly reinforced, thereby maximizing the scraper's utility.

DESCRIPTION OF THE PRIOR ART

Upon the emptying of the contents of a cylindrical container such as a paint container, invariably there remains in the container a residual amount of usable material. That material is generally spread thinly over the inner surface of the container. At first blush this residual material does not appear to amount to much and is frequently ignored and the container is thrown away. However, in reality, this amount of residual material can be considerable, especially when this amount is compounded over many dozens of containers. This latter situation frequently arises in the painting of a home where one-gallon cans are typical and it is frequently required to use ten or more such cans. The problem is also very pronounced in the case of paints because of their high viscosity. In the case of watery fluids, these fluids freely may be poured from the cylindrical container without concern over leaving much residue. However, where paints are concerned, due to their highly viscous characteristics, paint flow is relatively slow, thus causing impatience on the part of the user hoping to pour the last drop of paint out of the bucket and, in addition, causing a relatively thick amount of paint to line the inner walls of the "empty" paint can.

In an effort to recover this residual paint, painters frequently use spatula-like tools such as the so-called "five-in-one." In using this tool, the painter attempts to scrape away the residual paint from the cylindrical side walls as well as the flat base wall of the can. The difficulty with this approach lies in the fact that the scraper itself is formed in the shape of a flat spatula having relatively rigid characteristics. In addition to the five-in-one of known design, there are several patents drawn toward spatulas. Such patents include: U.S. Pat. No. 2,019,975, issued to Hoyer for MEANS FOR SPREADING OR REMOVING MATERIALS; U.S. Pat. No. 2,188,114, issued to Hubbard for SURFACE CLEANER; U.S. Pat. No. 2,900,656, issued to Tupper for CLEANING, SCRAPING AND MIXING IMPLEMENT; U.S. Pat. No. 2,935,758, issued to Muscott for CAN CLEANER; U.S. Pat. No. 4,197,017, issued to Whelan for PAINT STIRRER PADDLE; U.S. Pat. No. 4,355,432, issued to Storm, Jr. for HAND TOOL FOR SCRAPING PAINT FROM PAINT CAN; U.S. Pat. No. 4,380,840, issued to Rieckenberg for BOTTLE CLEANING DEVICE; U.S. Pat. No. 4,674,186, issued to Galiano for SCOOP SCRAPER TOOL; U.S. Pat. No. 4,987,635, issued to Young for CAN TROWEL; U.S. Pat. No. 5,291,992, issued to Olivetti for JAR UTENSIL KIT; U.S. Pat. No. 5,345,642, issued to Faldetta for DUAL SIZED C-SHAPED SCRAPER FOR CYLINDRICAL CONTAINERS; U.S. Pat. No. 5,347,676, issued to Saitoh for SQUEEGEE; and U.S. Pat. No. 5,491,868, issued to Baggenstos for CONTAINER CLEANING SPATULA.

However, while showing some improvements over the known spatulas and container cleaning implements, each of these representative articles of the prior art shows the same characteristic of being too rigid to allow flexing thereby preventing the adaptation of the tool for application to a curved surface. This is particularly important if one considers how paint is removed from a can. Frequently the painter first removes paint from the curved walls of the container by holding the edge of the spatula portion generally perpendicularly to the curved surface. After making a series of strokes in both directions from the top of the inner wall to the bottom, the painter then attempts to complete the maneuver by drawing the leading edge of the spatula along the base wall of the container.

While useful in theory, this approach is fraught with many problems. Given an infinite amount of time, the painter could use these scraping motions to generally remove the paint. The problem is one of lack of time on the part of the painter. As a result of this, the painter does not carefully draw the scraper along the flat bottom but rather hurriedly pulls the paint downward from the top of the bottom of the can to the bottom edge of the bottom of the can. The difficulty then remains that the painter cannot successfully remove that paint (which may be considerable in amount) which remains along the joint between the curved wall and the flat bottom wall.

With this problem in mind, U.S. Pat. No. 4,627,128, issued to Shea for TOOL FOR CLEANING THE INTERIOR SURFACES OF A CONTAINER, teaches a spatula having a cylindrical back wall with a flat base wall. This arrangement generally mirrors the construction of the paint can itself, except that the back wall defines only half a cylinder. While resolving some of the problems of the art, this type of spatula also creates some of its own problems. For example, this construction is limited to paint cans of sizes generally approximating that of the tool itself because of its inflexibility. In addition, this scoop-like construction is difficult for the painter to clean and the paint which may be recovered from the can as a paint saving exercise may readily be lost by remaining on the spatula itself, thus defeating the entire purpose of the paint salvaging process.

One answer to this problem might appear to be the provision of a paint scraper formed from a flexible material. The thinking is that this would allow the painter to effectively position the scraper at the curved intersection between the base of the cylindrical inner wall of the can and the flat bottom of the can. The difficulty with this arrangement is that after frequent uses the spatula becomes severely misshapen and, furthermore, the side edge of a spatula which is formed from a rigid material is valuable in using the edge to be perpendicularly pressed against the inner wall of the can so as to clean it. A spatula formed from a flexible material lacks that ability.

Accordingly, a spatula effective for removing paint from a paint can which maximizes paint recovery while minimizing work time remains wanting.

BRIEF DESCRIPTION OF THE PRESENT INVENTION

The present invention overcomes these and several other problems of the prior art. Specifically, it is an object of the present invention to provide a can scraper which includes both flexible and rigid characteristics.

It is a further object of the present invention to provide such a paint scraper which has a rigid handle, the handle terminating at a spatula portion which includes both rigid and flexible characteristics.

Yet another object of the present invention is to provide such a scraper which includes a rigid cross-member formed along the upper edge of the scraper.

An additional object of the present invention is to provide such a scraper in which the spatula portion includes rigid members at least partway down its side edges.

Yet an additional object of the present invention is to provide such a scraper in which the handle transitions into a rigid backbone formed down at least a portion of the spatula member.

Yet a further object of the present invention is to provide such a spatula which may be formed of any one of a variety of polymerized materials.

An additional object of the present invention is to provide such a spatula which may alternatively be composed of a metal, such as anodized spring steel.

Still a further object of the present invention is to provide such a spatula which resists warpage and tends to retain its shape even after multiple uses.

Yet a further object of the present invention is to provide such a spatula which is substantially rust-resistant and also resists denting and bending.

Yet an additional object of the present invention is to provide such a scraper which may be easily used by even the most impatient painter to effectively remove residual paint from paint cans.

Still a further object of the present invention is to provide such a scraper which may be effectively used to remove residual material in containers other than paint cans, such as in containers of a great variety of shapes and sizes.

These and other objects are achieved by providing a scraper having a spatula component and a rigid handle component. The spatula component is made of a substantially flexible material having formed thereon rigid members including rigid side ridges which are formed at least partially along the side edges of the spatula component. Substantially perpendicular to these rigid side members is a rigid upper crossmember which is formed at the top of the spatula component. The handle of the scraper itself is composed of a rigid material, which includes a rigid portion which is formed along the middle of the spatula component. The handle continues at least partially along the middle of the spatula component. This provides the spatula component with a substantially rigid backbone.

The scraper according to the present invention may be composed from a variety of materials including most polymerized materials. The scraper may also be composed of a metal such as steel or aluminum.

Further detail regarding the present invention may be found in the detailed description section which appears below. For a more complete understanding of the present invention, reference is made to the detailed description and accompanying drawings.

BRIEF DESCRIPTION OF THE DRAWINGS

Throughout the following description and in the drawings, identical reference numbers are used to refer to the same component shown in multiple figures of the drawings, in which:

FIG. 1 is a side view of a scraper according to the present invention shown in spaced-apart relation to a container of the type to be cleaned by the present invention;

FIG. 2 is a front view of the scraper according to the present invention;

FIG. 3 is a sectional view of the spatula component of the present invention taken along line 3—3 of FIG. 2;

FIG. 4 is an alternate view of the spatula component of the present invention taken along line 4—4 of FIG. 2;

FIG. 5 is a side view of the spatula component and a portion of the handle component of the scraper according to the present invention;

DETAILED DESCRIPTION OF THE PREFERRED EMBODIMENT OF THE PRESENT INVENTION

Figure 6:
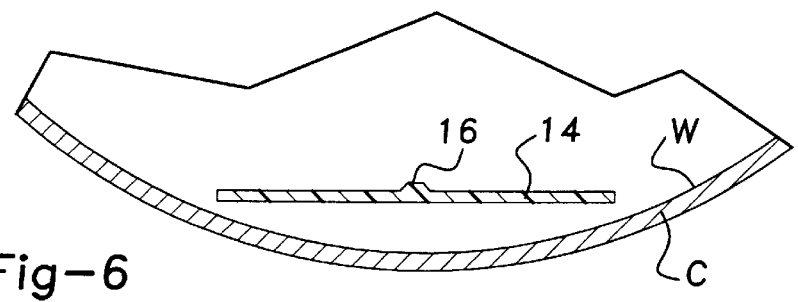
FIG. 6 is a sectional view of the spatula component shown in FIG. 4 in relation to a curved surface of a container being cleaned, also shown in a sectional view.

The drawings disclose the preferred embodiment of the present invention. While the configurations according to the illustrated embodiment are preferred, it is envisioned that alternate configurations of the present invention may be adopted without deviation from the invention as portrayed. The preferred embodiment is discussed hereafter.

At the outset, it is to be noted that although the present invention will be described with reference to a scraper for cleaning a paint can, the present invention evidences other utility wherever a tool may be used for removing material from a curved surface of a container and the like. For example, the scraper of the present invention may be used for removing foods such as peanut butter from food containers, adhesives such as wood glue from containers, and oils or greases from containers.

Referring to FIG. 1, a scraper, generally illustrated as 10, is shown in spaced-apart relation with respect to a container, generally illustrated as "C". While the illustrated container "C" is shown as being of the conventional paint can type, the scraper 10 may be used for removing a variety of materials from a variety of can types, as discussed above.

Referring to FIG. 2, a front view of the scraper 10 is illustrated. The scraper 10 includes a rigid handle component 12 and a spatula component 14. The handle component 12 is composed of a rigid material and is any one of a variety of shapes, and the illustrated elongated configuration is one such shape. The handle component 12 substantially terminates in the spatula component 14. However, a portion of the handle component 12, a rigid spine 16, is formed at least partially along the length of the spatula component 14. The rigid spine 16 provides rigidity and reinforcement for the spatula component 14 and thus allows flexing of a portion of the spatula component 14 around the rigid spine 16, illustrated in FIG. 7, as discussed below.

The spatula component 14 also includes other rigid reinforcing structures. Specifically, a pair of rigid crossmembers 18, 18' is formed to both sides of the handle component 12. The rigid crossmembers 18, 18' prevents the upper portion of the spatula component from flexing, thus allowing the scraper 10 to be used such that its edge may be dragged along the wall of the container "C". To further aid in the application, a pair of spaced-apart side ridges 20, 20' are formed along the upper edges of the spatula component 14. While the side ridges 20, 20' are shown as being formed beyond the approximate mid-point of the spatula component 14, a different configuration is possible.

Formed at the intersection of the crossmember 18 and the side ridge 20 is a corner-scraping edge 22 for scraping the surface formed beneath the lip of the can "C". Similarly, formed at the intersection of the crossmember 18' and the side ridge 20' is a corner-scraping edge 22'.

A leading edge 24 is defined along the edge of the area "F" of the spatula component 14. As will be described below, the leading edge is useful in cleaning the flat inner bottom wall of the can "C".

FIG. 3 illustrates a sectional view of the approximate upper portion of the spatula component 14 taken along line 3—3 of FIG. 2. This view shows the rigid arrangement of the crossmembers 18, 18' and the relationship to the side ridges 20, 20' and the rigid spine 16. It is clear from this configuration how the structure of the upper portion of the spatula component 14 prevents flexing.

FIG. 4 also illustrates a sectional view of the approximate lower portion of the spatula component 14 taken along line 4—4 of FIG. 2. This view shows the absence of rigid structures (with the exception of the rigid spine 16), and thus illustrates how the lower portion of the spatula component 14 is free to flex about the rigid spine 16.

FIG. 5 illustrates a side view of the spatula component 14 and a portion of the handle component 12. The view of FIG. 5 also illustrates the flexing portion of the spatula component 14, generally illustrated as "F", and a rigid portion of the spatula component 14, generally illustrated as "R".

Figure 7:
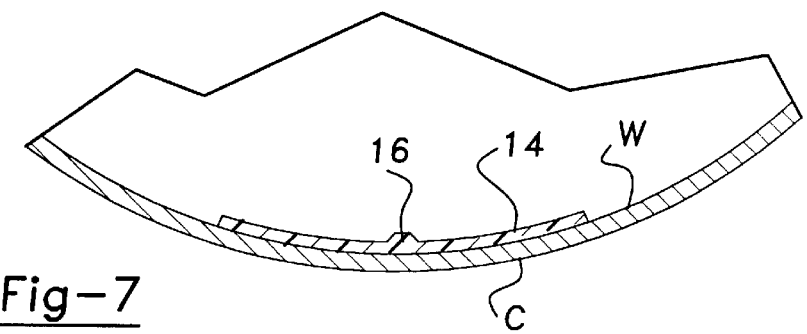
FIG. 7 is a view similar to that of FIG. 6, but showing the spatula component having been adapted to the curved inner surface of the container.

FIGS. 6 and 7 illustrate cross-sectional views of the lower, flexing section of the spatula component 14 taken approximately along line 4—4 of FIG. 2. A container "C" is also shown in section such that its curved inner wall, generally illustrated as "W", is clearly shown. In FIG. 6, the spatula component 14 is spaced apart from the wall "W" and is accordingly in its unflexed configuration. In FIG. 7, the spatula component 14 has been pressed against the inner wall "W" and has thus been flexed for adaption to the curvature of the wall "W".

Figure 8:
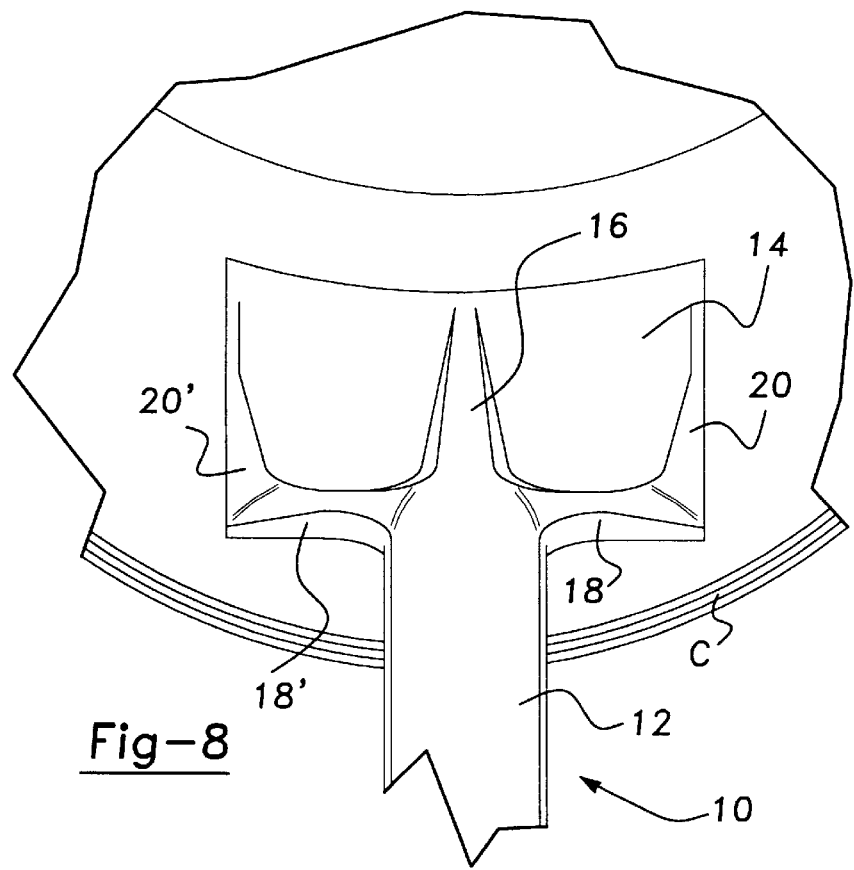
FIG. 8 is a perspective view of the spatula component as well as the handle component in relation to a container being cleaned in which a portion of the spatula component has been adapted to the curved inner surface.

FIG. 8 is a view of the scraper 10 in the position assumed in FIG. 7. As is shown, the lower end of the spatula component 14 (generally illustrated as "F" in FIG. 5) is allowed to flex to adapt to the shape of the inner wall of the container "C". However, the upper portion of the spatula component 14 is prevented from flexing because of the provision of the crossmembers 18, 18' and the rigid side ridges 20, 20'.

In operation, the user first performs a side-to-side motion to remove the excess material from the curved wall of the can by dragging the scraper of the present invention along one of its side edges. The user undertakes this operation while tilting the can to about a 45' angle. The excess material thus is collected. Thereafter, the user scrapes the leading edge 24 of the scraper 10 along the bottom of the can in a series of half-circular strokes. Then, holding the rigid handle component 12, the user positions the leading edge 24 at the intersection formed between the inner curved wall "W" and the bottom of the can "C" and presses the scraper 10 into the intersection. This action translates applied pressure to the rigid spine 16, which causes the flexible end of the spatula component 14 to adapt to the configuration of the inner curved wall "W" at the intersection formed along the flat bottom of the can "C". With the spatula component 14 flexed to follow the contour of the wall "W", the user pulls the residual material toward the opening of the can "C", thus allowing for it to be readily poured therefrom.

Although the present invention has been described herein with respect to specific embodiments hereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having thus described the invention, what is claimed is:

1. A scraper for use in removing material from a container having curved walls, the scraper comprising:

a handle component;

a spatula component integrally matched with said handle component, said spatula component including a substantially flat blade having a top and a pair of opposed sides, said sides defining a length, said spatula component including rigid top members which extend from said handle component along said top and to said pair of opposed sides, said spatula component further including a pair of rigid side members which extend from said top at least partially along said length of said sides, wherein said flat blade includes a mid-portion, said scraper further including a rigid spine extending from and continuous with said handle component, said rigid spine being formed substantially along said mid-portion of said blade.

2. The scraper of claim 1, wherein said pair of rigid side members extend approximately halfway along said length of said sides.

3. The scraper of claim 1, wherein each of said pair of rigid side members has a thickness, said thickness defining a taper, said taper being thickest at said top.

4. The scraper of claim 1, wherein said rigid spine includes a thickness, said thickness being greater adjacent said handle component than along other portions of the rigid spine.

5. The scraper of claim 1, wherein said rigid spine extends almost the full length of said flat blade.

6. The scraper of claim 1, wherein each of said rigid top members join each of said rigid side members to form a corner scraping edge.

7. The scraper of claim 1, wherein said spatula component includes a terminal edge, and wherein an area is formed between each of said rigid side members and said terminal edge, said area being substantially flexible.

8. The scraper of claim 1, wherein said handle component and said spatula component are composed of a polymerized material.

9. The scraper of claim 1, wherein said handle component and said spatula component are composed of a metal.

10. A scraper for use in removing material from a container having curved walls, the scraper comprising:

a handle component;

a spatula component integrally mated with said handle component, said spatula component including an upper portion having a central area, a lower portion having a central area, and a rigid spine formed along said central portions, said upper portion being substantially inflexible and said lower portion being substantially flexible around said rigid spine, wherein said spatula component includes a top edge, a pair of opposed side edges, a leading bottom edge and further including a pair of rigid top members formed along said top edge, said top members extending from said handle component.

11. The scraper of claim 10, further including a pair of rigid side members formed at least partially along said opposed side edges.

12. The scraper of claim 11, wherein said rigid side members extend approximately halfway between said top edge and said leading bottom edge.

13. The scraper of claim 11, wherein one each of said top members intersect with one each of said side members to form a paint scraping edge.

* * * * *

UNITED STATES PATENT AND TRADEMARK OFFICE
CERTIFICATE OF CORRECTION

PATENT NO. : 5,875,515
DATED : March 2, 1999
INVENTOR(S) : Dallas

It is certified that error appears in the above-identified patent and that said Letters Patent is hereby corrected as shown below:

Title Page [54] "Flexbile" should be --Flexible--.

Column 1, line 1, "FLEXBILE" should be --FLEXBILE--.

Column 5, line 47, "45' angle" should be --45° angle--.

Signed and Sealed this

Fourteenth Day of March, 2000

Attest:

Q. TODD DICKINSON

Attesting Officer

Commissioner of Patents and Trademarks